United States Patent [19]
Watanabe

[11] Patent Number: 5,021,996
[45] Date of Patent: Jun. 4, 1991

[54] DEVICE FOR USE IN DEVELOPING AND TESTING A ONE-CHIP MICROCOMPUTER

[75] Inventor: Nobuhisa Watanabe, Tokyo, Japan
[73] Assignee: Sony Corporation, Tokyo, Japan
[21] Appl. No.: 370,063
[22] Filed: Jun. 21, 1989

Related U.S. Application Data

[63] Continuation of Ser. No. 919,148, filed as PCT JP86/00022 on Jan. 22, 1986, published as WO86/04433 on Jul. 31, 1986, abandoned.

[30] Foreign Application Priority Data

Jan. 22, 1985 [JP] Japan ................... 60-9769

[51] Int. Cl.⁵ ............................................ G06F 11/00
[52] U.S. Cl. ................................. 364/900; 364/925.6; 364/965.76; 371/16.1
[58] Field of Search ............... 364/200, 900; 371/16.1, 371/20

[56] References Cited

U.S. PATENT DOCUMENTS

| | | | |
|---|---|---|---|
| 4,128,873 | 12/1978 | Lamiaux | 364/200 |
| 4,153,933 | 5/1979 | Blume, Jr. et al. | 364/200 |
| 4,277,827 | 7/1981 | Carlson et al. | 364/200 |
| 4,349,870 | 9/1982 | Shaw et al. | 364/200 |
| 4,486,827 | 12/1984 | Shima et al. | 364/200 |
| 4,489,414 | 12/1984 | Titherley | 371/20 |
| 4,504,926 | 3/1985 | Toyoda | 364/900 |
| 4,524,417 | 4/1985 | Kimoto | 364/200 |
| 4,527,234 | 7/1985 | Bellay | 364/200 |
| 4,622,647 | 11/1986 | Saenard et al. | 364/580 |
| 4,628,448 | 12/1986 | Murao | 364/200 |
| 4,641,308 | 2/1987 | Sacarisen et al. | 364/200 |
| 4,670,838 | 6/1987 | Kawata | 364/200 |
| 4,672,534 | 6/1987 | Kamiya | 364/200 |

FOREIGN PATENT DOCUMENTS

| | | |
|---|---|---|
| 2418496 | 3/1979 | France . |
| 2498782 | 4/1982 | France . |
| 55-112746 | 8/1980 | Japan . |
| 59-4051 | 1/1984 | Japan . |
| 59-206968 | 11/1984 | Japan . |
| 60-11941 | 1/1985 | Japan . |
| 2015214 | 7/1979 | United Kingdom . |

*Primary Examiner*—Gareth D. Shaw
*Assistant Examiner*—Matthew C. Fagan
*Attorney, Agent, or Firm*—Lewis H. Eslinger

[57] ABSTRACT

A microcomputer universal package has testing terminals and switching circuitry for selecting first and second operations. In the first operation, as an evaluator type, a test device is connected to the testing terminals of the package. In the second operation, as a piggyback type, a rewritable ROM (EPROM) is connected to the testing terminals of the package. The testing terminals are automatically switched for the particular operation by the switching circuitry. Accordingly, the same device can be used as the evaluator type chip and the piggyback-type chip, which reduces the time and the cost of developing the program. In addition, since the piggyback-type chip, the evaluator-type chip, and a mask-type ROM chip can be constructed with the same pin arrangement, the program can be evaluated by the evaluator-type chip in the mask-type ROM mounting board that becomes the final product without requiring an interface board.

6 Claims, 2 Drawing Sheets

FIG. 3
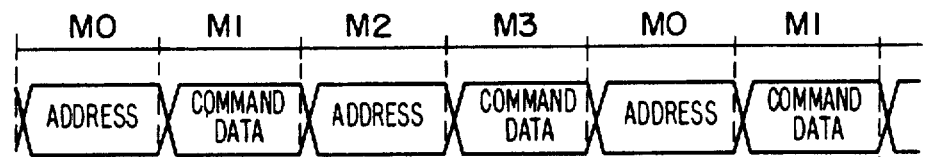
FIG. 4A
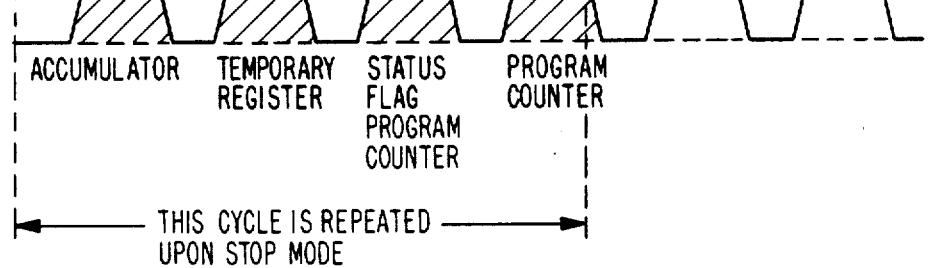
FIG. 4B
FIG. 5
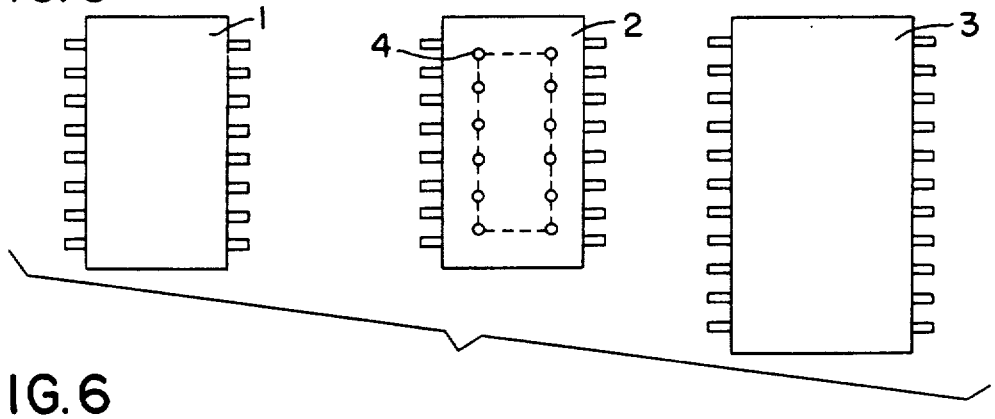
FIG. 6
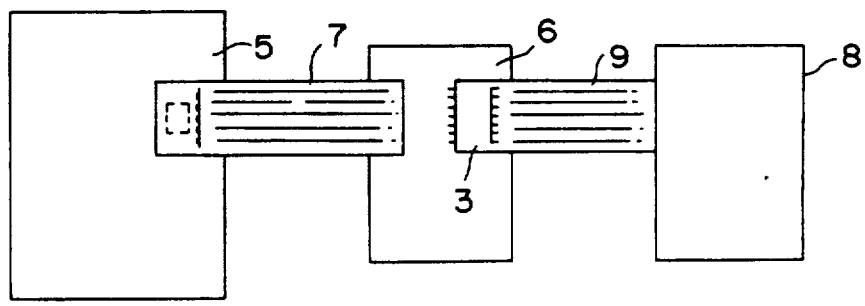

DEVICE FOR USE IN DEVELOPING AND TESTING A ONE-CHIP MICROCOMPUTER

This is a continuation of application Ser. No. 06/919,148, filed Sep. 22, 1986, now abandoned.

TECHNICAL FIELD

This invention relates generally to a data storage apparatus and, more particularly, to a universal package detachably connected to a single-chip microcomputer for use as a development tool.

BACKGROUND OF THE INVENTION

A single-chip microcomputer is typically shipped with a program provided in the final product in the form of a mask-type, read only memory (ROM). The mask-type, read only memory is incapable of being rewritten because the information stored in the ROM is written to the ROM during the manufacturing process using a mask. Therefore, to allow developing and evaluating of a program, an evaluator-type chip can be used with a piggyback-type chip. In general, the piggyback-type chip has a program address bus and a data bus which are led out to the outside and connected to a rewritable and erasable EPROM mounted to the upper portion of that chip. The evaluator-type chip requires, in addition to the program address bus, the data bus, and the like, a control signal and the like at the outside for being capable of single-step program evaluation. The evaluator-type chip is used in an early stage of the development of the program to check the operation of the microcomputer, and the piggyback type is used in a later stage to check the actual operation of the program.

FIG. 5 schematically illustrates input and output pin configurations of a prior art mask-type ROM chip, a piggyback-type chip, and an evaluator-type chip. Reference numeral 1 designates a package of the mask ROM chip, reference numeral 2 designates a package of the piggyback-type chip, and reference numeral 3 designates a package of the evaluator-type chip. On a surface of the piggyback-type chip package 2, there are mounted a plurality of program testing terminals 4 that are used to connect the EPROM to the piggyback-type chip package. The evaluator-type chip 3 has more pins than either the mask-type ROM chip package 1 or the piggyback-type chip package 2. The additional pins of the evaluator-type chip 3 are needed to connect pins such as a terminal for an external memory, a terminal for a control signal, and so on to the package of the evaluator chip 3. Accordingly, although packages 1 and 2 are the same relative to the physical placement of the pins, that is, pin arrangement, and also in the manner in which they are connected to the internal circuitry, that is program pin configuration, package 3 is different from packages 1 and 2 in pin arrangement and pin configuration. Furthermore, the pin arrangement and configuration of package 2 allows the packages 1 and 2 to be loaded on a final product board. However, package 3 cannot be loaded on a final product board.

In the prior art, when the evaluation of a microcomputer is made by using the evaluator-type chip, as shown in FIG. 6, an interface board 6 is necessary because of the incompatibility of the terminals of the piggyback-chip 2 with those of the evaluator-type chip of FIG. 5.

Therefore, in the prior art, an interface board is required for use with the product board 5. The product board 5 and the interface board 6 are connected with a flat cable 7 which has connections at either end of the cable, the evaluator-type chip package 3 is mounted using the evaluator chip terminals at a predetermined position on the interface board 6. The evaluator-type chip package 3 and a development tool or insert kit emulator 8, which is a debugger, and the like are connected using a flat cable 9 having connectors at either end of the cable.

In the prior art, since the piggyback-type chip and the evaluator-type chip require different input and output signals, they are designed independently. Further, since the packages thereof are different as described above, packages of different types must be constructed, respectively. Among the various problems that result from the development of independent designs is that the program development requires much time, and the manufacturing cost is increased. Further, the evaluator-type chip cannot be directly incorporated into the board of the final product which has mounted thereon the microcomputer so that another interface board and so on must be provided as described above.

In view of this, it is desirable to provide, in accordance with the invention, a universal package which is fully compatible with the final product board and the evaluator-type chip to obviate the cumbersome arrangement of using an interface board because of incompatibility of the terminals of the piggyback-type chip and the evaluator-type chip. Therefore, the piggyback-type chip and the evaluator-type chip are not necessarily developed separately.

SUMMARY OF THE INVENTION

A storage apparatus according to this invention comprises a universal package 10 having a plurality of testing terminals 12 at predetermined positions and a switching circuitry 30 located within this package 10 for switching first and second operations, wherein in the second operation the testing terminals are connected with a rewritable read only memory, while in the second operation the above-mentioned program testing terminals are connected with testing apparatus 8.

In the first operation, the testing apparatus, such as a development tool 8, is connected to the testing terminals 12 of the package 10 so as to allow the package to operate as the evaluator type. In the second operation, the rewritable read only memory (EPROM)11 is connected to the testing terminals 12 of the package 10 so as to allow the package to operate as the piggyback-type chip. Therefore, the same package 10 can be used with both the evaluator-type chip and the piggyback-type chip.

BRIEF DESCRIPTION OF THE DRAWINGS

FIGS. 3, 4A and 4B are timing diagrams used to explain the operation of FIG. 2;

FIG. 5 is a pictorial representation illustrating input and output pins of respective conventional chips; and FIG. 6 is a pictorial representation showing a connection relationship of a prior art evaluator-type chip.

DETAILED DESCRIPTION OF PREFERRED EMBODIMENT

An embodiment of this invention will hereinafter be described in detail with reference to FIGS. 1 to 4.

Figure 1:
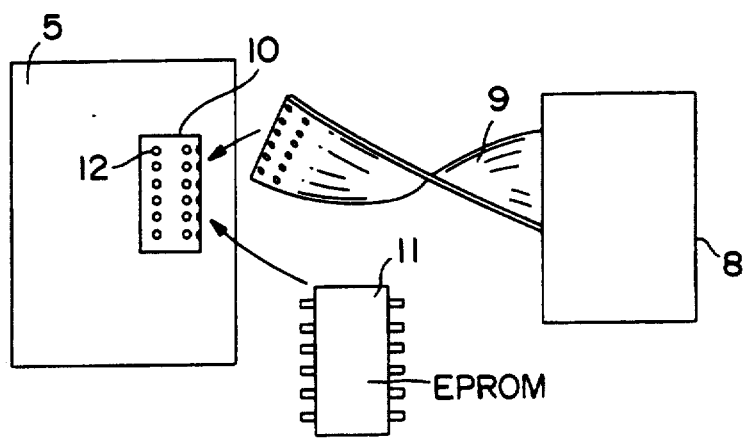
FIG. 1 is a construction diagram showing an embodiment of this invention.

FIG. 1 shows one embodiment of this invention. Referring to that figure, although at the final shipment stage of the final product board 5, such mask-type ROM chip 1 as shown in FIG. 5 is mounted thereon, in the early stage of the development the evaluator-type chip is mounted thereon to check the operation of the computer.

Then, the piggyback-type chip is mounted thereon to carry out the evaluation of the program. In this embodiment of the invention, package 10 is shared by both the piggyback-type chip and the evaluator-type chip and is mounted on the final product board 5.

Further, on one surface of package 10 a plurality of terminals 12 are provided which are connected with an EPROM 11 when it is operated as the piggyback-type chip. The terminals 12 are connected with one end of a flat cable 9, with the other end of the flat cable connected to the development tool 8 when it is operated as the evaluator-type chip.

Figure 2:
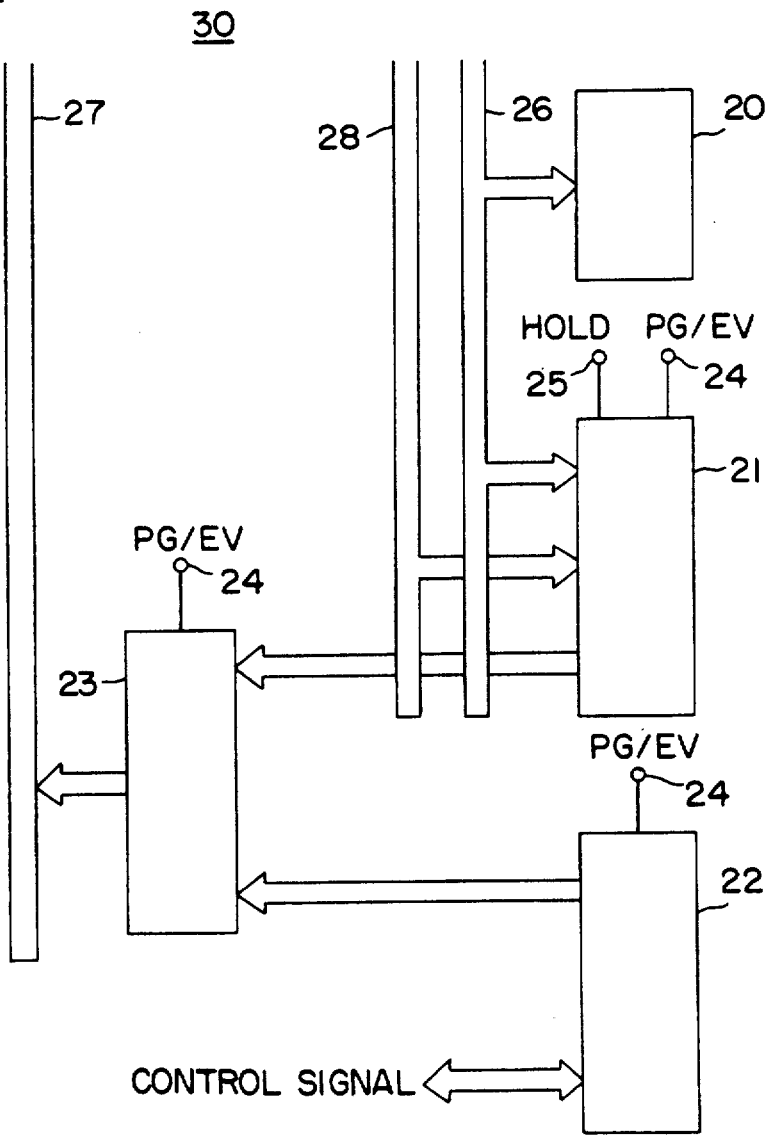
FIG. 2 is a schematic in block diagram form showing one example of a main portion of this invention.

The switching of the program testing terminals 12 of the package 10, to operate as either the piggyback type or the evaluator type, is carried out using switching circuitry with a signal multiplexing and selecting circuit 30 shown in FIG. 2.

In FIG. 2, reference numeral 20 designates an address terminal; reference numeral 21 designates an address, command, data, and bus multiplex terminal; reference numeral 22 designates a command, data, and control-signal multiplex terminal; reference numeral 24 designates an input terminal which is supplied with a signal used to switch the piggyback type (PG) and the evaluator type (EV); reference numeral 23 designates a selector for selecting in response to a signal; either PG or EV input at terminal 24, which multiplexer 21 or 22 can send or receive commands or data to the command-/data bus 27 and the command/data bus is coupled to the microcomputer chip reference; numeral 28 designates an internal command/data bus of the microcomputer chip, reference number 26 designates an address bus; reference numeral 29 designates a bus coupled to multiplexer 21 and selector 23, reference numeral 30 designates a bus coupled to multiplexer 22 and selector 23; and reference numeral 25 designates an input terminal which is supplied with a signal used to switch the normal program execution mode and the program stop mode in the single-step operation when the package is operated as the evaluator type. The address terminal 20 and the multiplex terminals 21 and 22 correspond to testing terminals 12 of the package 10.

When a signal of, for example, "1" is supplied to the terminal 24, the multiplex terminals 21 and 22 and the selector 23 are switched, so as to operate as the evaluator type. Specifically, the multiplex terminal 22 serves as the input and output terminal of a reference clock, an operation control signal, and the like. The multiplex terminal 21 is switched, between two operations, on the basis of whether or not a hold (HOLD) signal is supplied to the terminal 25. For example, if the hold signal is not supplied to the terminal 25, multiplex terminal 21 is placed in a state to carry out the normal program execution operation. In this state it delivers the program address of the bus 26 during the period of first and third clocks M0 and M2 in one machine cycle formed of clocks M0, M1, M2 and M3, (FIGS. 4A and 4B). Further, the multiplex terminal 21, in this state, takes in a command signal and a data signal read out from the ROM during the period of the second and fourth clocks M1 and M3. The command signal and data signal are then delivered through the selector 23 to the connected command data bus 27.

When a hold signal is supplied to the terminal 25, the multiplex terminal 21 is placed in the program-stop operation mode for single-step operation. Thus, it delivers the content of an accumulator (not shown) through an internal command/data bus 28 during the period of the first clock M0; it delivers the content of a temporary register (not shown) through the internal bus 28 during the period of the second clock M1; it delivers a status flag and the content of a program counter (not shown) through the internal bus 28 during the period of the third clock M2; and during the period of the clock M3 shown in FIG. 4, it delivers the content of the program counter through the internal bus 28. The above cycle is repeated for the stop mode.

FIGS. 4A and 4B illustrate the data contents of the multiplex terminal 21 when the package is operated as the above-mentioned evaluator type. FIG. 4A shows the data content of the multiplex terminal 21 when the program runs in the normal state, that is, when the normal program is executed. While FIG. 4B illustrates the data content of the multiplex operation mode and the like, that is, when the program is stopped in the single-step operation.

When a signal of, for example, "0" is supplied to the terminal 24, the multiplex terminals 21 and 22 and the selector 23 are respectively switched so as to operate as the piggyback type. Then, the multiplex terminal 21 (FIG. 2) delivers a program address shown in FIG. 3 to a bus 26, as shown in FIG. 2. The multiplex terminal 22 takes in the command signal and the data signal read out of the EPROM 11 (FIG. 1).

When the package is operated as the evaluator type, the development tool 8 is connected through the flat cable 9 to the address terminal 20 and the multiplex terminals 21 and 22. When the package is operated as the piggyback type, the EPROM is connected to the address terminal 20 and the multiplex terminals 21 and 22. Therefore, based on the level of the signal supplied to the terminal 24 the package 10 can be used for both the piggyback type and the evaluator type.

The selector 23 (FIG. 2) is operated so as to receive the command and the data derived from the multiplex terminal 22 or 21 and supply command and data to the bus 27. The selector 23 receives data from either terminal 21 or 22 depending on the signal applied to the terminal 24, however, address terminal 20 does not depend on the signal applied to the terminal 24 and address terminal 20 receives addresses from the address bus 26 in the operation of both the piggyback type and the evaluator type.

The package 10 has testing terminals 12 and switching circuitry for selecting first and second operations. In the first operation as an evaluator type, a test device is connected to the program testing terminals of the package, which are automatically switched by the switching circuitry. While in the second operation as a piggyback type, a rewritable ROM (EPROM) is connected to the program testing terminals of the package accordingly, the same device can be used as the piggyback-type chip and the evaluator-type chip. This reduces the time and the cost of developing the program. In addition, since the piggyback-type chip, the evaluator-type chip, and the mask-type ROM chip can be constructed with the same pin arrangement, the program can be evaluated by the evaluator-type chip in the mask-type ROM mounting board which becomes the final product. Consequently, in contrast to the prior art, an interface board is not required.

I claim:

1. A universal package for a microcomputer chip detachably mounted on a microcomputer chip final product board for selectively and detachably connecting said microcomputer chip to testing means or to a rewriteable read-only memory, said testing means being used at an early stage to check operation of said microcomputer chip and said rewriteable read-only memory being used at a later stage in developing and evaluating a program stored in a permanent read-only memory to be permanently connected to said microcomputer chip final product board, said package comprising:

a plurality of testing terminals for connection selectively to said testing means and to said rewriteable read-only memory during successive stages of checking the operation of the microcomputer chip and the evaluation of said program presently in the microcomputer chip and to be subsequently stored in said permanent read-only memory; and switching means connected to said plurality of testing terminals, for establishing a first internal electrical configuration in which a first set of said testing terminals are activated when said rewriteable read-only memory is connected to said testing terminals and a second internal electrical configuration in which a second set of said testing terminals are activated when said testing means is connected to said testing terminals, said first and second sets of activated terminals being different;

wherein said switching means comprises an input terminal and means responsive to a signal applied to said input terminal, said responsive means being constructed so that when said signal has a first value said responsive means establishes said first internal electrical configuration and when said signal has a second value said responsive means establishes said second internal electrical configuration.

2. A universal package according to claim 1 wherein said signal is a digital signal.

3. A universal package according to claim 2 wherein said means responsive to a signal applied to said input terminal comprises first and second multiplex means and a selector means each being responsive to said first and second values of said digital signal and further comprising bus means connected to said plurality of testing terminals, to said selector means and to said first and second multiplex means, whereby said first and second multiplex means and said selector means cooperate with said testing means in response to said second value of said digital signal and with said rewriteable read-only memory in response to said first value of said digital signal.

4. A universal package according to claim 3 wherein said first multiplex means comprises an operation switching means for switching between a single step operation when a hold signal is applied to said switching means and a program execution operation in absence of said hold signal.

5. A universal package according to claim 4 wherein said single step operation is operative during: a first phase of operation of said microcomputer chip for receiving contents of an accumulator at said first multiplex means and sending said contents of said accumulator to said testing means through said bus means; a second phase of said operation of said microcomputer chip for receiving contents of a temporary register at said first multiplex means and sending said contents of said temporary register to said testing means through said bus means; a third phase of said operation of said microcomputer chip for receiving contents of a program counter at said first multiplex means and sending a status flag and said contents of said program counter to said testing means using said bus means; and a fourth phase of said operation of said microcomputer chip for receiving the contents of said program counter at said first multiplex means and sending said contents of said program counter to said testing means.

6. A universal package according to claim 5 wherein said program execution operation is operative during: said first phase of operation of said microcomputer chip and said third phase of operation of said microcomputer chip for receiving a program address from an address means and sending said address to said testing means through said bus means; said second phase of operation of said microcomputer chip and said fourth phase of operation of said microcomputer chip for receiving a command signal and a data signal from said permanent read-only memory and sending said command signal and said data signal to said testing means through said bus means.

* * * * *